United States Patent
Boutet

(10) Patent No.: US 11,206,297 B2
(45) Date of Patent: Dec. 21, 2021

(54) VIDEO STREAMING

(71) Applicant: LIVESCALE TECHNOLOGIES INC., Montreal (CA)

(72) Inventor: Laurent Boutet, Montreal (CA)

( * ) Notice: Subject to any disclaimer, the term of this patent is extended or adjusted under 35 U.S.C. 154(b) by 0 days.

(21) Appl. No.: 16/352,973

(22) Filed: Mar. 14, 2019

(65) Prior Publication Data

US 2019/0289052 A1 Sep. 19, 2019

Related U.S. Application Data

(60) Provisional application No. 62/644,802, filed on Mar. 19, 2018.

(51) Int. Cl.
*G06F 15/16* (2006.01)
*H04L 29/06* (2006.01)
*H04N 21/2187* (2011.01)

(52) U.S. Cl.
CPC .......... *H04L 65/601* (2013.01); *H04L 65/607* (2013.01); *H04L 65/608* (2013.01); *H04L 65/80* (2013.01); *H04N 21/2187* (2013.01)

(58) Field of Classification Search
CPC ..... H04L 65/602; H04L 65/608; H04L 65/80; H04L 65/4076; H04L 65/601; H04L 65/1069; H04L 65/4084; H04L 65/4069; H04L 41/0816; H04L 41/22; H04L 41/5009; H04L 51/04; H04L 51/10; H04L 51/24; H04L 63/062; H04L 63/08; H04L 63/10; H04L 63/0428; H04L 63/20; H04L 65/403; H04L 65/607; H04L 65/1089; H04L 67/02; H04L 67/1008; H04L 67/1031

USPC ........ 709/217, 219, 224, 231, 238, 203–204
See application file for complete search history.

(56) References Cited

U.S. PATENT DOCUMENTS

| | | | |
|---|---|---|---|
| 5,768,535 A | 6/1998 | Chaddha et al. | |
| 6,292,834 B1 | 9/2001 | Ravi et al. | |
| 6,298,385 B1 | 10/2001 | Sparks et al. | |
| 6,490,627 B1 | 12/2002 | Kalra et al. | |
| 7,114,174 B1 | 9/2006 | Brooks et al. | |
| 7,716,090 B1 | 5/2010 | Rabenold et al. | |
| 7,984,179 B1 | 7/2011 | Huang | |
| 8,341,667 B2 | 12/2012 | Jacobs et al. | |
| 8,495,237 B1* | 7/2013 | Bilinski | H04L 47/38 709/231 |
| 8,516,529 B2 | 8/2013 | Lajoie et al. | |
| 8,526,490 B2 | 9/2013 | Perlman et al. | |
| 8,542,682 B2 | 9/2013 | Thyni et al. | |
| 8,707,185 B2 | 4/2014 | Robinson et al. | |

(Continued)

OTHER PUBLICATIONS https://www.wowza.com/docs/get-viewer-data-in-wowza-streaming-cloud.
https://www.wowza.com/docs/track-usage-and-activity-in-wowza-streaming-cloud.
https://www.wowza.com/docs/wowza-streaming-cloud-users-guide.

*Primary Examiner* — Farzana B Huq
(74) *Attorney, Agent, or Firm* — Anglehart et al.

(57) ABSTRACT

A live broadcast streaming system is provided, comprises an ingest decoding module; a processing and encoding module; a video routing module; a collection module; a real-time analysis module; a reporting module; and a control module. A media streaming event can be collected from one source and delivered to heterogenous viewing platforms, while collecting viewer analytics from the heterogenous platforms to provide an aggregated view of analytics.

11 Claims, 19 Drawing Sheets

(56) References Cited

U.S. PATENT DOCUMENTS

| | | |
|---|---|---|
| 8,752,081 B2 | 6/2014 | Ramaswamy et al. |
| 8,849,964 B2 | 9/2014 | Ralston et al. |
| 8,893,207 B2 | 11/2014 | Perlman et al. |
| 9,026,671 B2 | 5/2015 | Gillies et al. |
| 9,032,450 B2 | 5/2015 | Algie et al. |
| 9,066,144 B2 | 6/2015 | Yerli |
| 9,456,248 B2 | 9/2016 | Laksono |
| 9,467,723 B2 | 10/2016 | Osminer |
| 9,565,430 B1 | 2/2017 | Steele et al. |
| 9,712,890 B2 | 7/2017 | Shivadas et al. |
| 2002/0136298 A1 | 9/2002 | Anantharamu et al. |
| 2007/0033625 A1 | 2/2007 | Chiu |
| 2010/0095318 A1 | 4/2010 | Wagner |
| 2011/0197237 A1 | 8/2011 | Turner |
| 2011/0222403 A1* | 9/2011 | Suh .................. H04L 41/5009 370/231 |
| 2012/0009890 A1* | 1/2012 | Curcio ................ H04L 29/06 455/230 |
| 2012/0303834 A1 | 11/2012 | Adam et al. |
| 2013/0103814 A1 | 4/2013 | Carrasco et al. |
| 2013/0195168 A1* | 8/2013 | Singh ................ H04N 21/2187 375/240.02 |
| 2014/0195675 A1 | 7/2014 | Silver |
| 2015/0032858 A1* | 1/2015 | Motrenko .............. H04L 51/10 709/219 |
| 2015/0127848 A1* | 5/2015 | Houdaille ........... H04L 65/4084 709/233 |
| 2016/0269787 A1 | 9/2016 | Lin et al. |
| 2016/0373499 A1* | 12/2016 | Wagner ............. H04N 21/2187 |
| 2018/0302455 A1* | 10/2018 | Bordoloi ............. H04L 65/607 |

\* cited by examiner

FIG. 7

New Event

Step 2 – Prepare your event

Planning
○ Start Now  ◉ Schedule It

Start time
Start date  04:30 PM
01/26/2018

Stop time
Stop date  08:30 PM
01/26/2018

Resources

Region
North America East (Ohio)

Ingest
Haivision KB 4K

Player
auto

Previous | Next

FIG. 8

New Event

Step 3 – Configure your event

Video Quality
- ○ HD (720p)
- ○ Full HD (1080p)
- ▶ Ultra HD (4K)

VR / 360°
- ▶ Enable VR
- ☐ Stereoscopic (3D)
- ☐ Ambisonic Audio

Advanced
- ☐ Geolocation Analytics

Previous | Next

| Events | | | | | | + Create Event |
|---|---|---|---|---|---|---|
| Live Events List  Launching | | | | | | |
| 🔍 | | | | | | Show 10 entries |
| Name | Start Time | End Time | Quality | Status | Actions | |
| Test_Panasonic_Haivision | 04:30 PM<br>January 26th 2018 | 08:30 PM<br>January 26th 2018 | Ultra HD (4k) | Scheduled | Control Room  Cancel Event | |
| Showing 1 to 1 of 1 entries | | | | | Previous  1  Next | |

VIDEO STREAMING

TECHNICAL FIELD

The present application relates to the field of media streaming systems, for example video streaming systems.

BACKGROUND

Multimedia data transmission over the internet is becoming more and more popular. In this context, one traditional transmission method involves the client requesting the downloading of the multimedia data. While being relatively simple, this process is not an optimal approach as the client is required to wait for the downloading to complete. The delay caused by the downloading time could be considerable depending on a number of factors such as internet speed or the size of the multimedia data downloaded.

A more advanced method of multimedia data transmission involves a content server at one network site "streaming" the multimedia information over the network to a client. In this method, the information can be used by the client as it arrives (i.e., just-in-time rendering), rather than waiting for the entire data set to arrive before being able to use it. The way it works is that the data received is buffered into a cache memory at the client computer, and is continuously processed as soon as, or soon after, being received.

Live streaming is the delivery of Internet content in real-time, as events happen for a live video feed or at a scheduled time for a pre-recorded video. Live internet streaming requires a form of source media (e.g. a video camera, an audio interface, screen capture software, or a recording), an encoder to digitize the content, a media publisher, and a content delivery network to distribute and deliver the content. Live streaming does not need to be recorded at the origination point, although it frequently is.

Generally, streaming refers to the situation where a user watches digital video content or listens to digital audio content on a computer screen and speakers (ranging from a smartphone, through a desktop computer to a large-screen home entertainment system) over the Internet. With streaming content, the user does not have to download the entire digital video or digital audio file before they start to play it.

There are challenges with streaming content on the Internet. If the user does not have enough bandwidth in their Internet connection, they may experience stops in the content, and some users may not be able to stream specific content due to not having compatible computer or software systems. Managing the quality data transferred based on the bandwidth is an essential factor that can contribute to the quality of streaming.

Streaming services are becoming more and more popular in different fields. Some popular streaming services are the video-sharing website YouTube; Twitch and Mixer, which live stream the playing of video games; Netflix, which streams movies and TV shows; and Spotify and Apple Music, which stream music.

Traditional approaches to multimedia streaming provide content that is encoded for one specific destination and transmitted. Distributing a live event to multiple targets today is complicated, costly and does not scale efficiently. Among other, the two major obstacles. The first barrier is the problem with onsite encoding and publishing which needs a bandwidth directly correlated the number of destinations to encode and publish the event. The second obstacle is with audience analytics. Each type of destination involves a separate tool to obtain the Key Performance Indicators ("KPI"), and no unified view of the audience across the multiple destinations is available.

A live media event that is streamed has a specific start time and end time. For the viewer to be able to be aware of the live event before or after the live event, the media streaming manager needs to arrange for additional media, and this requires additional management effort.

Based on the preceding, improved apparatus and methods are needed to provide onsite encoding and publishing which requires a smaller bandwidth. Such apparatus methods would ideally provide the KPIs resulting in giving the end user with content that is highly personalized and flexible.

SUMMARY

Applicant has found that a media streaming event can be collected from one source and delivered to heterogenous viewing platforms, while collecting viewer analytics from the heterogenous platforms to provide an aggregated view of analytics.

Applicant has also found that a media streaming event can be collected from one source and delivered to heterogenous viewing platforms, while specifying content for pre-event and/or post-event media with such content being adapted for and delivered to the heterogenous platforms.

Applicant has also found that a media streaming event can be collected from one source and delivered dynamically to heterogenous viewing platforms, while changing those platforms during the event. For example, this can be used to stream a media event to more platforms to gain greater attention, while thereafter reducing the number of platforms on which the media event continues. This can be used to attract viewers to continue to view the media event on more desirable platforms. A more desirable platform can be a platform from which the user or broadcaster can derive greater revenue. The user can specify the change schedule or set the criteria for the change, such as a function of viewer analytics collected.

In some aspects, there is provided a platform for live broadcasting which includes an ingest and decoding module, a processing and encoding module, a dynamic video routing module and a control module. The control module itself comprises of a processor and a non-transitory computer readable medium. The non-transitory computer readable medium has instructions that when executed by the processor cause it to receive from end-user instructions regarding an event such as the source of the event, the streaming schedule for broadcasting the event, the configuration details for streaming the event and desired delivery platforms and deliver the event based on the schedule received for broadcasting.

The platform receives the encoded event stream ("the contribution stream") from the source set and decodes the contribution stream by the ingest and decoding module providing a decoded stream. The decoded stream then goes through the processing encoding module which produces multiple output streams each having a different bitrate for use by different delivery platforms. These multiple output streams then go to the dynamic video routing module before being delivered to the delivery platform either directly or via a web streaming module.

In one aspect, the platform can provide placeholders for each delivery platform. The user can set up details about the placeholders such as the schedule for placeholders, the content of the placeholders, the desired delivery platforms. The platform then creates placeholders on each of the delivery platform based on the user instructions.

In another aspect, the platform has other modules that are used to provide the user with key performance indicators of the event streaming on different delivery platforms. The platform collects key performance indicators from different delivery platforms using a collection module. Then it preforms different analysis as required by the user on the collected data using its real-time analysis module and provides the results of the analysis through a reporting module to the user interface.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BRIEF DESCRIPTION OF THE DRAWINGS

The present examples will be better understood with reference to the appended illustrations which are as follows:

FIG. 7 shows a screenshot of the user interface page used to create an event, according to a particular example of implementation;

FIG. 8 shows a screenshot of the user interface page used for scheduling of the event, according to a particular example of implementation;

FIG. 9 shows a screenshot of the user interface page used to set up the configuration of the event, according to a particular example of implementation;

FIG. 10 shows a screenshot of the user interface page used to select destinations to which the event has to be broadcast, according to a particular example of implementation;

FIGS. 12A, 12B and 12C show a screenshots showing examples of the placeholder created by the disclosed invention on YouTube and Facebook;

FIG. 13 shows a screenshot of the control manager page of the user interface page when launching the video engine, according to a particular example of implementation;

DESCRIPTION

Figure 1A:
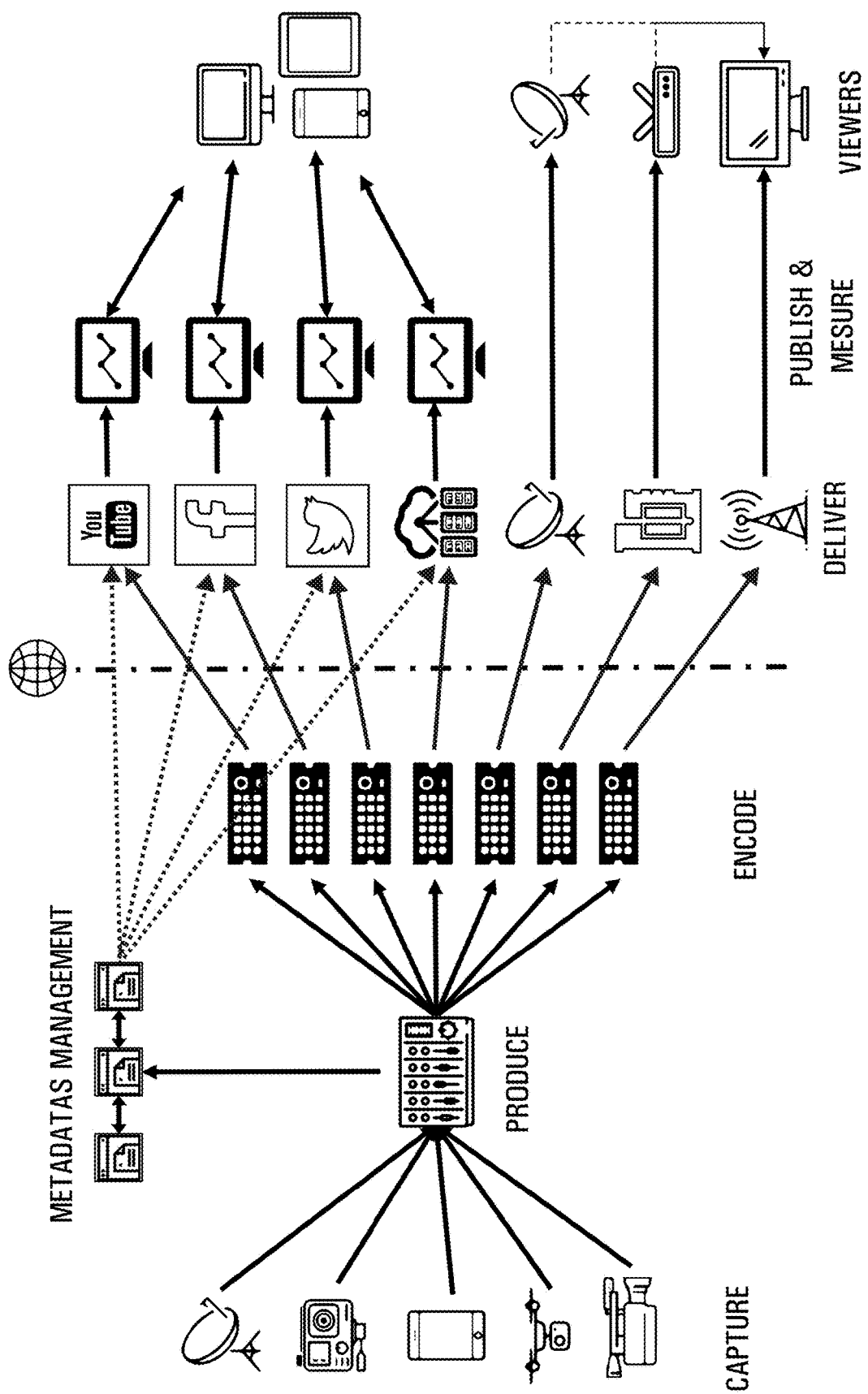
FIG. 1A is a schematic illustration of a traditional multimedia streaming system.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

In below description, the disclosed multimedia streaming system may be referred to as the platform, the multimedia system or the streaming system.

The present invention discloses a platform for live broadcasting which includes an ingest and decoding module, a processing and encoding module, a dynamic video routing module and a control module. The control module itself comprises of a processor and a non-transitory computer readable medium. The non-transitory computer readable medium has instructions that when executed by the processor cause it to receive, from an end-user, instructions regarding an event such as the source of the event, the streaming schedule for broadcasting the event, the configuration details for streaming the event and desired delivery platforms and deliver the event based on the schedule received for broadcasting.

The platform receives the encoded event stream ("the contribution stream") from the source set and decodes the contribution stream by the ingest and decoding module providing a decoded stream. The decoded stream then goes through the processing encoding module which produces multiple output streams each having a different bitrate for use by different delivery platforms. These multiple output streams then go to the dynamic video routing module before being delivered to the delivery platform either directly or via a web streaming module.

In one aspect, the platform can provide placeholders for each delivery platform. The user can set up details about the placeholders such as the schedule for placeholders, the content of the placeholders, the desired delivery platforms. The platform then creates placeholders on each of the delivery platform based on the user instructions.

In another aspect, the platform has other modules that are used to provide the user with key performance indicators of the event streaming on different delivery platforms. The platform collects key performance indicators from different delivery platforms using a collection module. Then it preforms different analysis as required by the user on the collected data using its real-time analysis module and provides the results of the analysis through a reporting module to the user interface.

FIG. 1A illustrates a traditional multimedia streaming system wherein the content has to encoded for each specific destination and then transmitted. Therefore, encoding and publishing would need a larger bandwidth. Also, audience analytic aggregation from different destinations has to be done manually.

Figure 1B:
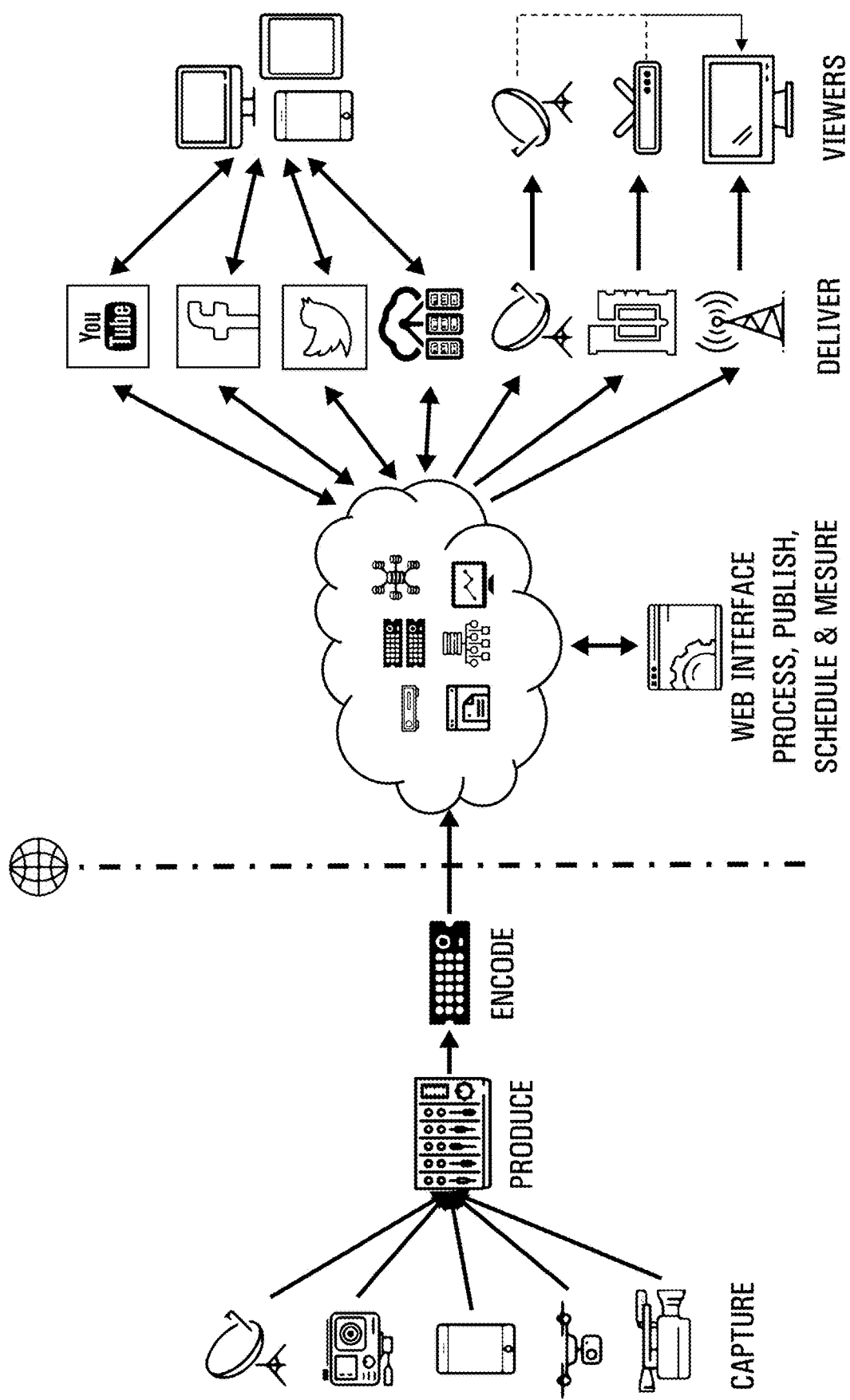
FIG. 1B is a schematic illustration of the multimedia streaming system as according to one embodiment of the present invention.

FIG. 1B shows an embodiment of the present invention. As illustrated, the present invention addresses, among other, the foregoing problems with traditional multimedia streaming systems by providing improved methods and apparatus for broadcasting Multimedia. As illustrated, the present invention, provides solutions for the two main obstacles of the traditional multimedia systems by providing an automated, scalable cloud-based infrastructure that is capable of cloud transcoding and publishing as well as an automated real-time analytics engine.

The transcoding and publishing modules of the present invention are capable of using one contribution encoder for different broadcasting platforms. Such capability enables the system to use a much narrower bandwidth to upload the encoded data to the cloud platform. Consequently, the cloud platform creates different encoding variants according to the needs of any specific destination and publishes them automatically to that specific destination. Hence, the cloud platform would be capable of providing multiple encoding variants.

Figure 2:
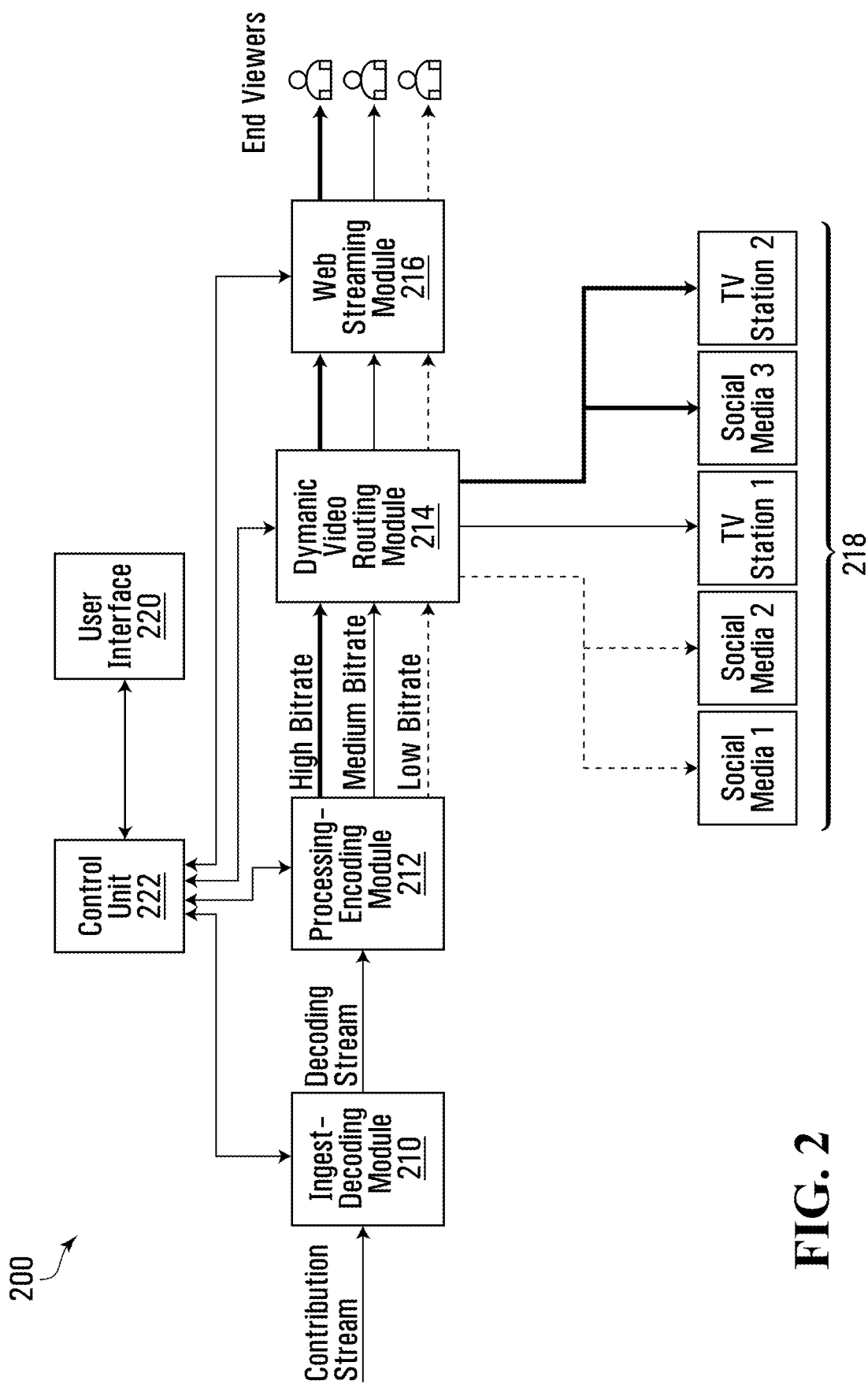
FIG. 2 shows a block diagram showing an automated, scalable cloud-based infrastructure that is capable of cloud transcoding and publishing as according to one embodiment of the present invention.

As illustrated in FIG. 2, in a cloud transcoding and publishing module 200, a contribution stream enters an ingest-decoding module 210 which may be a C++ module with librtmp with a decoded stream as output. The decoded stream is then transferred to a processing-encoding module 212 which may be a C++ module with x264 and x265. This module further forwards the decoded stream in different bitrates to a dynamic video routing module 214 which may be a C++ module with librtmp and libavformat. The dynamic video routing module 214 can distribute the video to different media outlets 218 or to a web streaming module 216 and over the top ("OTT") distribution.

All the modules, 210, 212, 214, 216 and 218 are controlled by a control unit 222 which is connected to a user interface ("UI") 220 providing further flexibility to the system and allowing the user to adjust the output of each module.

The automated real-time analytics engine of the platform provides the collection, aggregation, storage, and display of all the KPIs available from all the destinations. A unified view is presented in real-time and a report is generated after the event.

Figure 3:
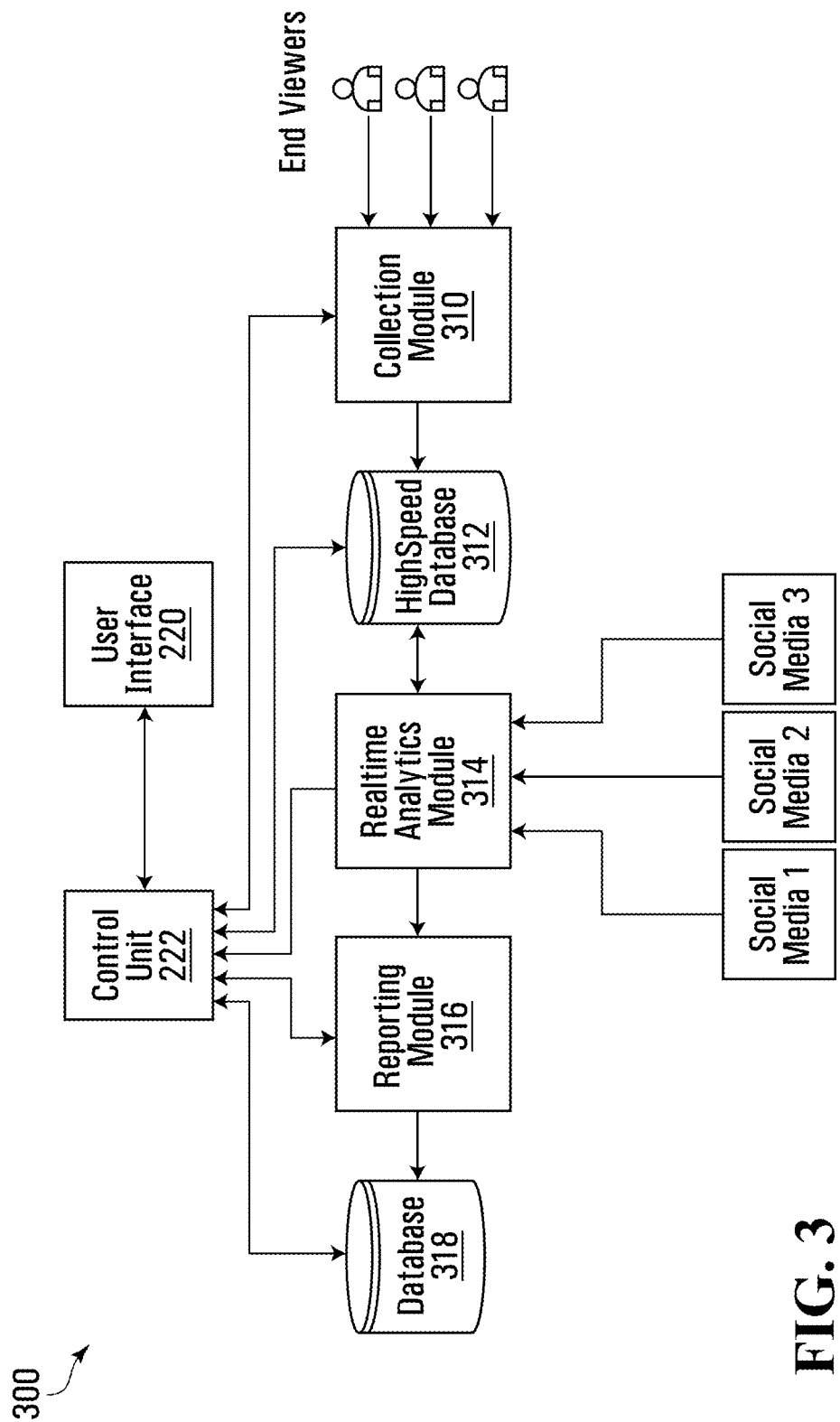
FIG. 3 shows a block diagram illustrating an automated real-time analytics engine that is capable of collection, aggregation, storage, and display of all the KPIs available from different destinations as according to one embodiment of the present invention.

FIG. 3 illustrates the real-time analytics engine 300. The KPI data received from end viewers is collected by a collection module 310 before being transferred to a high-speed database 312. The data is further transferred to a real-time analysis module 314 which in addition to receiving data from the users receives KPIs from the social media. The real-time analysis module 314 can transfer the aggregated data directly to the client and/or to a reporting module 316 which can send the data to the client and have it saved in a database 318.

The collection module 310 collects KPI data in a known manner, however, the system collects KPI data from heterogenous delivery platforms. This can involve the use of a collection profile for each of the heterogenous delivery platforms. The collection profile can be a dataset that defines how the KPI data is to be obtained from each delivery platform, for example the API calls required and how the KPI data is to be recovered from such calls.

All the modules, 310, 312, 314, and 316 are controlled by the control unit 222 which is connected to the user interface ("UI") 220 providing further flexibility for the system and allowing the user to adjust the output of each module. The control unit 222 (main API) execute the instructions stored on a non-transitory computer readable medium to cause the platform to execute different steps as described herein.

Figure 4:
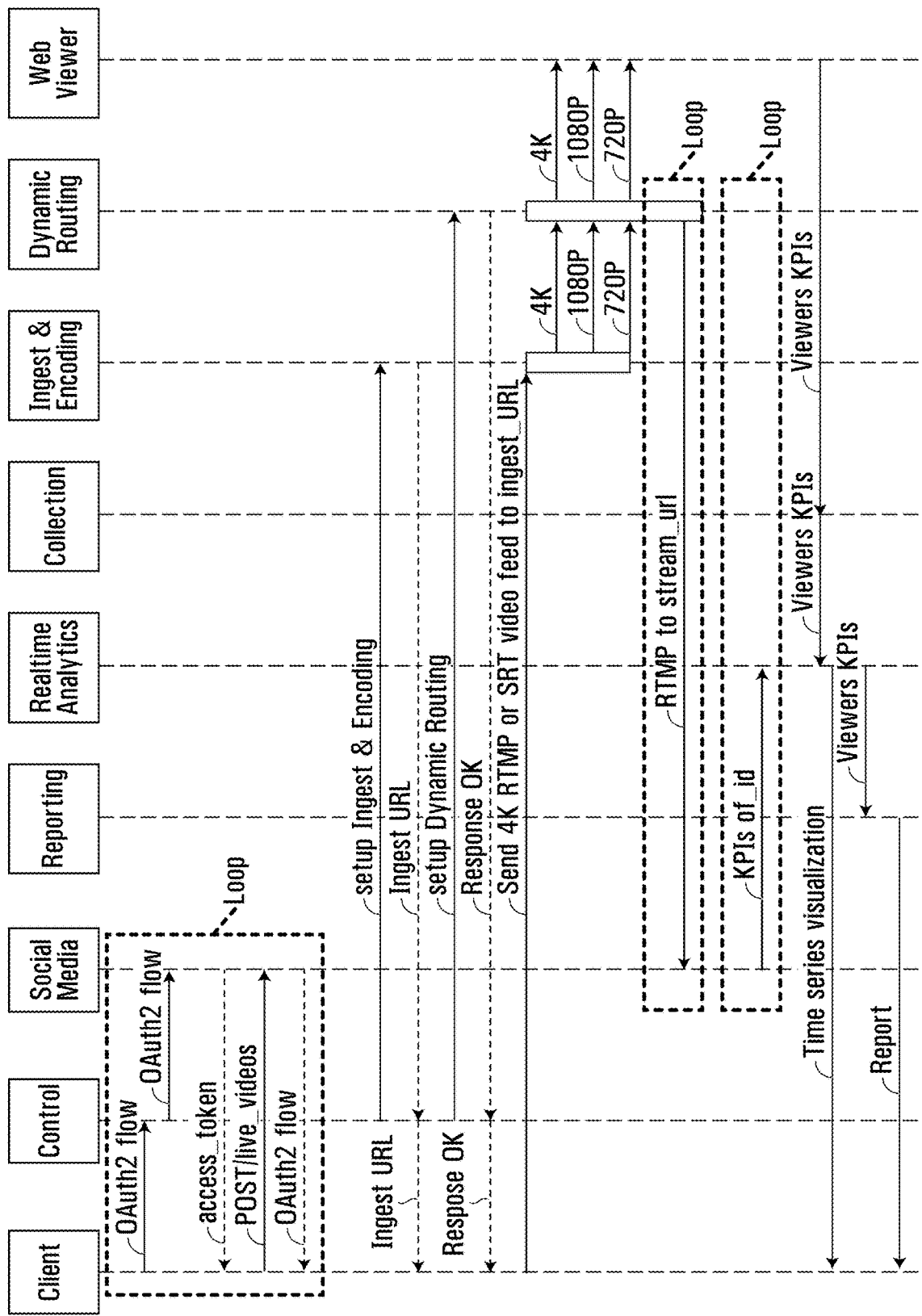
FIG. 4 shows a sequence diagram of the multimedia streaming system disclosed as according to one embodiment of the present invention.

FIG. 4 shows a sequence diagram of the multimedia streaming system disclosed. Starting from the client authentication to the end Viewer. As illustrated in FIG. 4, in an embodiment of the present invention, the client needs to authenticate against a third-party provider using a standard method for access delegation such as OAuth2 standard which is an open standard for access delegation, commonly used as a way for Internet users to grant websites or applications access to their information on other web-sites but without giving them the passwords.

OAuth allows access tokens to be issued to third-party clients by an authorization server, with the approval of the resource owner. The third party then uses the access token to access the protected resources hosted by the resource server. OAuth2 is also capable of allowing the invention's platform to communicate securely with the third-part an application programming interface (API).

The platform further uses a user interface ("UI") to provide the user login and password of the third-party service so that the platform receives and stores the proper credentials in a JavaScript Object Notation (JSON) which is an open-standard file format that uses human-readable text to transmit data objects consisting of attribute-value pairs and array data types.

An example of such JSON format login and password used in some embodiments is as follows:

```
{
    "expiry_date" : 1512415796910.0,
    "token_type" : "Bearer",
    "refresh_token" : "1/ChmVj5Pl3vssOPlZfqt4ECQuDGjlvMrfB-sFdLp4T-0",
    "id_token" : "eyJhbGciOiJSUzl1NilNzlwMzkifQ._zVpjr5DhJNKfFv-y491qv0C8YKl7m3cJagH9Q",
    "access_token" : "ya29.GlsYBZ7lrqgbmN7Xkq-DgM1gFABRB3BqGssllc7bVaYzjYpMin887yKf6-alBx4KA7pU_Z_bnsEgoGN4ha1b-kkYOick71EOkzLpdWu7RbF",
    "name" : "Laurent B."
}
```

The user can select one or more destinations on which the multimedia product is to be streamed such as Facebook, Twitter, Youtube, in addition to OTT streaming. The platform's backend connects to the services using the access token which is the credential that can be used by a client to access an API, and to create new live events with the proper Application Programming Interface ("API") calls. The events can be created and terminated at any time, and this can be different for different platforms without affecting other platforms. For example, the client or user can make a POST request to live_videos edge from the following paths/live_videos. When posting to this edge, a LiveVideo will be created and the following JSON is returned:

```
{
    "id" : "1391851000923657",
    "stream_url" : "rtmp://live-
api.facebook.com:80/rtmp/1391851000923657",
        "secure_stream_url" : "rtmps://live-
api.facebook.com:443/rtmp/1391851000923657",
    "stream_secondary_urls" : [ ],
    "secure_stream_secondary_urls" : [ ],
    "livevideo_id" : "1391851000923657",
    "permalink_url" : "/1071685299606897/videos/
1391850994256991/",
    "videoId" : "1391850994256991"
}
```

When a new event is created, the platform allocates resources. The resource allocation is a process in which the control unit 222 (main API) allocates the resources to create different modules. Those modules are created and dedicated for each new event and will be destroyed when the event ends. The virtualized resources are allocated to process that event. A cloud scheduler module is used to reserve the computing, storage, and network resources. Compute resources can comprise of generic processors such as x86 or ARM, with or without Graphics Processing Units (GPUs) or Field Programmable Gate Arrays (FPGAs) accelerators. Storage resources can comprise any Object, Block or Filesystem storage. Network resources can comprise of any Transmission Control Protocol (TCP/IP) connection with various bitrates.

The control unit 222 manages the destinations according to the user-specified parameters (that may depend on viewer data as well). The control module can receive information for creating new destinations or for activating/deactivating an existing destination using the dynamic routing module as follows:

```
{
    "ingest_url" : "rtmp://live-360.facebook.com:80/
rtmp/596610997354941?s_l=1&a=ATg1Y1Fs8OwnS3ox",
    "status" : "live",
    "error" : null,
    "uuid" : "39571924-cadb-ab31-e636-c9d8be042329",
    "event_title" : "Test",
    "enabled" : true,
    "_id" : "241061026243275",
}
```

Depending on a number of parameters such as the resolution, color depth, codecs, number of destinations, etc. the platform will reserve different resource sizes. This capability is known as scheduler logic. For example, to encode smaller resolution like 720p with H264 codec, the platform may only need a generic processor such as x86 core, whereas encoding a high-quality 4K resolution with HEVC codec may require an x86 processor with Nvidia GPU acceleration.

When the resources are allocated, the platform starts one or multiple new instances of the platform's Operating System (OS) which contains the ingest, encoding, publishing, and analytics modules also known as the OS boot and setup.

Using automation techniques such as DevOps techniques, the different modules can be configured in accordance to the event settings based on different factors such as the number of encoding variants, resolution, color depth, codecs, destinations, etc. Some examples of the template processor is jinja which allows to highly automate modules initial configuration.

In one aspect of the present disclosure, a dedicated ingest and transcoding module also known as a Virtual Machine is created and configured to receive the contribution feed and encode it to multiple variants. Usually, the video stream is sent over the Internet or any other unmanaged network using either wired or wireless connections. Alternatively, the video stream could also be sent through a managed network which is a network that is built, operated, secured and managed by a third-party service provider such as a direct connection or Satellite connection.

Real-Time Messaging Protocol (RTMP) and Secure Reliable Transport (SRT) are the most popular contribution protocols today to send live video over the Internet while Video codecs are usually H264, H265, VP9 or AV1.

Figure 5A:
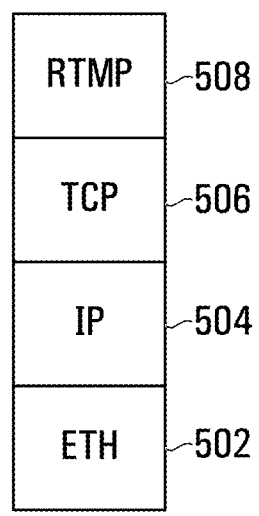
FIG. 5A shows a block diagram Real-Time Messaging Protocol (RTMP) messaging protocol.

FIG. 5A illustrates RTMP is a TCP-based messaging protocol which maintains persistent connections and allows low-latency communication. To deliver streams smoothly and transmit as much information as possible, it splits streams into fragments, and their size is negotiated dynamically between the client and server.

Figure 5B:
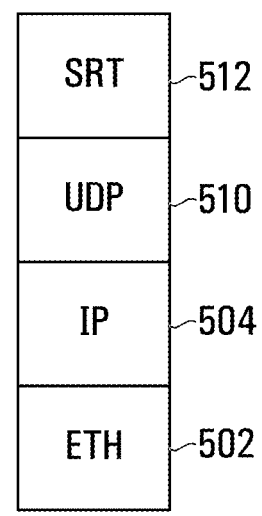
FIG. 5B shows a block diagram Secure Reliable Transport (SRT) messaging protocol.

As illustrated in FIG. 5B, SRT is a software library designed for live video streaming over the public internet. SRT implements the logic of connection and controlled transmission similar to TCP, however, it does it in userspace using UDP protocol as an underlying transport layer.

In one embodiment the ingest_URL of this instance looks like: rtmp://qod7oalz-auto.in.livescale.tv/live/stream OR srt://qod7oalz-auto.in.livescale.tv. In one aspect of the present disclosure, RTMP and SRT live video feed is received, decoded and processed through processes such as downsizing, framerate conversion, VR transformation according to the selected configuration:

```
{
    "_id" : "576ed34ed538265b7a7eee99",
    "chunk_size" : "2000",
    "format" : "hls",
    "vr" : false,
    "stereoscopic" : false,
    "cube_map" : false,
    "video_codec" : "h264",
    "audio_codec" : "aac",
    "name" : "Ultra HD (4K)",
    "variants" : [
        {
            "_id" : "57af3f689e5fce1e22c0a282",
            "audio" : {
                "samplerate" : 48,
                "bitrate" : 192
            },
            "video" : {
                "width" : 3840,
                "height" : 2160,
                "bitrate" : 20000,
                "fps" : 30
            }
        },
        {
            "_id" : "57af3f689e5fce1e22c0a284",
            "audio" : {
                "samplerate" : 48,
                "bitrate" : 128
            },
            "video" : {
                "width" : 1920,
                "height" : 1080,
                "bitrate" : 8000,
                "fps" : 30
            }
        },
        {
            "_id" : "57af3f689e5fce1e22c0a284",
            "audio" : {
```

```
            "samplerate" : 48,
            "bitrate" : 128
         },
         "video" : {
            "width" : 1280,
            "height" : 720,
            "bitrate" : 3000,
            "fps" : 30
         }
      },
      {
         "_id" : "57af3f689e5fce1e22c0a286",
         "audio" : {
            "samplerate" : 48,
            "bitrate" : 96
         },
         "video" : {
            "width" : 854,
            "height" : 480,
            "bitrate" : 1000,
            "fps" : 30
         }
      }
   ]
}
```

In some embodiments the platform module packages all the different variants for over the top ("OTT") distribution using Dynamic Adaptive Streaming over HTTP (DASH), also known as MPEG-DASH or HTTP Live Streaming (HLS). OTT is a media distribution practice that allows a streaming content provider to sell audio, video, and other media services directly to the consumer over the internet via streaming media as a standalone product. The platform can simultaneously provide these on the loopback network interface for consumption by the dynamic video routing module 214 such as social media and broadcast networks. This can be done by doing internal restream like rtmp://127.0.0.1/live/720

In some embodiments, the whole process from resource allocation to the OS boot and setup is streamlined to be executed automatically in less than two minutes.

The purpose of Ingest module 210 is to receive the contribution stream from the event location. In some embodiments, the video stream is sent over the Internet or any other unmanaged network using either a wired or wireless connections. In one embodiment the video can be sent through a managed network such as Direct connection or Satellite. Specific protocols are required to achieve the transmission. In one embodiment, the ingest module supports two protocols over IP, RealTime Multimedia Protocol (RTMP) and Secured Reliable Transport (SRT). RTMP is the most popular protocol to send video over the Internet. RTMP runs over TCP but is limited to H264 codec, itself limited to 4K resolution and 8 bits color depth. SRT is a newer protocol, running over the User Datagram Protocol (UDP). It is totally agnostic with the type of video without limitation and is much more secure. This module mostly uses the network and computing resources.

The purpose of processing/encoding module 212 is to process and encode the stream received by the ingest module to different variants. In some embodiments, depending on the configuration, this module will process and encode the unique input feed to multiple streams with various resolutions that can range from 240p to more than 16 k preferably between 240p to 8 k, codecs such as H.264, HEVC, VP9, and AV1, bitrates ranging from 200 Kbps to 20 Mbps or more, framerates ranging from 12 fps to 30 fps or more, color depths 8 bits to 10 bits and more, and geometries ranging from 16:9 and 2:1 or any other aspect ratio.

A codec encodes a data stream or a signal for transmission and storage, possibly in encrypted form, and the decoder function reverses the encoding for playback or editing. Codecs are used in videoconferencing, streaming media, and video editing applications. In telecommunications and computing, bitrate or bit rate is the number of bits that are conveyed or processed per unit of time. Frame rate (expressed in frames per second or fps) is the frequency (rate) at which consecutive images called frames appear on a display. The term applies equally to film and video cameras, computer graphics, and motion capture systems. Frame rate may also be called the frame frequency and be expressed in Hertz. In one embodiment of the present invention, this module uses compute resources like x86, GPU, and FPGA.

The purpose of dynamic video routing module 214 is to package and publish the multiple streams received by the encoding module to different destinations. Depending on the configuration this module will select one or multiple variants, package and publish them to multiple destinations, using different protocols. Every configuration is derivate from the UI or the API (programmatic interface). Depending on user choices, the system will create the best configuration through logic rules.

In one embodiment the present invention uses HTTP Live Streaming also known as HLS or Dynamic Adaptive Streaming over HTTP ("DASH"). Both these formats for delivering video over the web are chunked based protocols, meaning every time portion (N seconds) of the video is written in a file and distributed to the viewer through the HTTP protocol. Also, these protocols support Adaptive BitRate ("ABR"), meaning multiple variants can be available and the video player can select the best variant depending on the available bandwidth and network congestion. They are usually used for final delivery to the end viewer (websites and mobile applications).

In another embodiment, the present invention uses RTMP, SRT or Web Real-Time Communication ("WebRTC"). Real-time video protocol (cf. ingest module) used this time as an output/emitter. They allow sending a unique, selected variant to third-party receivers comprising but not limited to Content Delivery Networks ("CDN"), Social Media, TV Stations, Cable Operator, Mobile Application, Web sites, Set-top boxes.

The packaging/publishing comprises a logic control to decide which variant to select from the processing/encoding module and can publish the best quality to the configured destinations. This module mostly uses the network, storage and compute resources.

As shown in FIG. 2, in some embodiments, the dynamic video routing module 214 consumes the different variants on the loopback interface, rendered by the transcoding module. It routes them dynamically to the third-part RTMP endpoints created during phase #2 (rtmp://live-api.facebook.com:80/rtmp/1391851000923657). A REST API is used to dynamically change the configuration:

```
[
   {
      "ingest_url" : "rtmp://127.0.0.1/live/720",
      "stream_url" : "rtmp://live-api.facebook.com:80/rtmp/700802143449633 ",
      "error" : null,
      "enabled" : true,
      "_id" : "168501648586",
```

```
    },
    {
        "ingest_url" : "rtmp://127.0.0.1/live/1080",
        "stream_url" : "rtmp://live-
iad.twitch.tv/app/live_132949120_9FQu9F6yoWCpKuSgG",
        "error" : null,
        "enabled" : true,
        "_id" : "101851143874",
    },
    {
        "ingest_url" : "rtmp://127.0.0.1/live/4k",
        "stream_url" : "rtmp://a.rtmp.youtube.com/live2/g09m-0p3c-yecu-
39hr",
        "error" : null,
        "enabled" : true,
        "_id" : "377394745126",
    }
]
```

The routing module spawns a new process for every element of the array/destination. Each process connects to its ingest_url and sends the video stream to stream_url. The _id will be used for the analytics collection.

A process management framework is used to keep the state and start/stop only the required processes, so it does not affect the streaming to the other destinations.

Real-time analytics module 314 is shown in FIG. 3. The purpose of this module is to collect, aggregate and visualize the audience KPIs of different destinations.

In some embodiments, the present invention the platform uses the subscription method to collect the data. For HLS, DASH and WebRTC formats, every time an end-user visualizes a video stream, the video player subscribes and reports to the collector service connected to a high-performance database to support millions of transactions.

In one embodiment of the present disclosure, the platform uses the polling method to collect the data. For RTMP and SRT formats, the collector service will connect periodically to the destination API and get the required KPIs and store them in the high-performance database.

In some embodiments, the platform has an aggregation service, able to consolidate the data stored in the database. The aggression can be done regardless of the method by which the data is collected; therefore, it could be conducted both of subscription or a polling mechanism, from all destinations. This service also relies on various aggregation functions built-in the high-performance database (through API).

In one embodiment, an analysis module collects periodically a common set of KPIs from the different destinations through their APIs. During the collection process, KPIs are sanitized and aggregated in a high-performance database for real-time visualization. A copy is stored in a more regular database to be able to store all the KPIs for a full reporting of the event. The _id unique identifier used by the dynamic routing module is also used for the analytics collection like:

Make a GET request to video_insights edge from the following paths: /{_id}/video_insights, the following JSON is returned:

```
{
    "_id" : "168501648586",
    "timestamp" : 1516570413,
    "current_live_views" : 2234,
    "total_live_views" : 15489,
    "total_live_views_unique" : 12458,
}
```

In an aspect of the present disclosure, the platform can have a visualization service module in the user interface capable of reading the results of the aggregated data from the database and makes them available for display in a web browser.

In one embodiment, the platform uses a WebSocket connection to maintain an open socket and avoid costly reconnection. In an alternative embodiment, the platform can use an HTTP/2 protocol to produce the final data stream to a third-party service. The process can introduce a delay which can be between 10-15 seconds, but the data flow is in real-time. This module mostly uses the network, storage and computing resources.

The current_live_views and timestamp variables are used to build a time series for proper visualization. The total_live_views and total_live_views_unique are cumulative, and so only the latest value is used.

Figure 6:
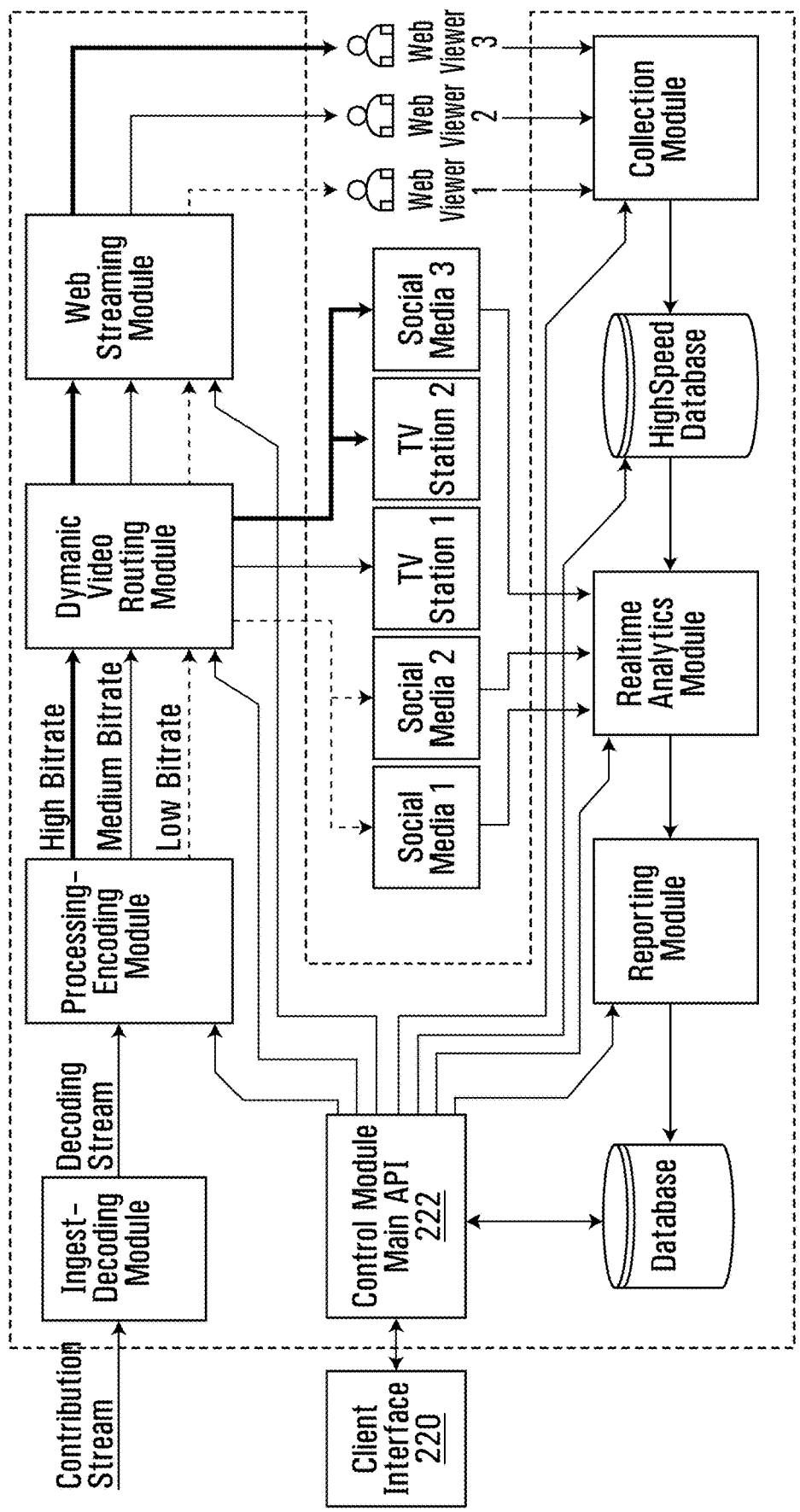
FIG. 6 shows a block diagram illustrating the platform having both the automated, scalable cloud-based infrastructure and the automated real-time analytics engine.

As illustrated in FIG. 6, in some embodiments of the present disclosure, the platform can provide both the automated, scalable cloud-based broadcasting infrastructure and the automated real-time analytics engine using the same control module and client interface. The User Interface or client interface 220 communicates with the control module 222 (main API). Then the control module communicates with the other modules using RESTFul API calls (JSON over HTTPS).

In one aspect, the control unit 222 may adjust the setting of the broadcasting module based on the data it receives from the real-analytic module automatically, either based on the pre-set factors given by a user or by using known machine learning technics in the art.

Figure 7:
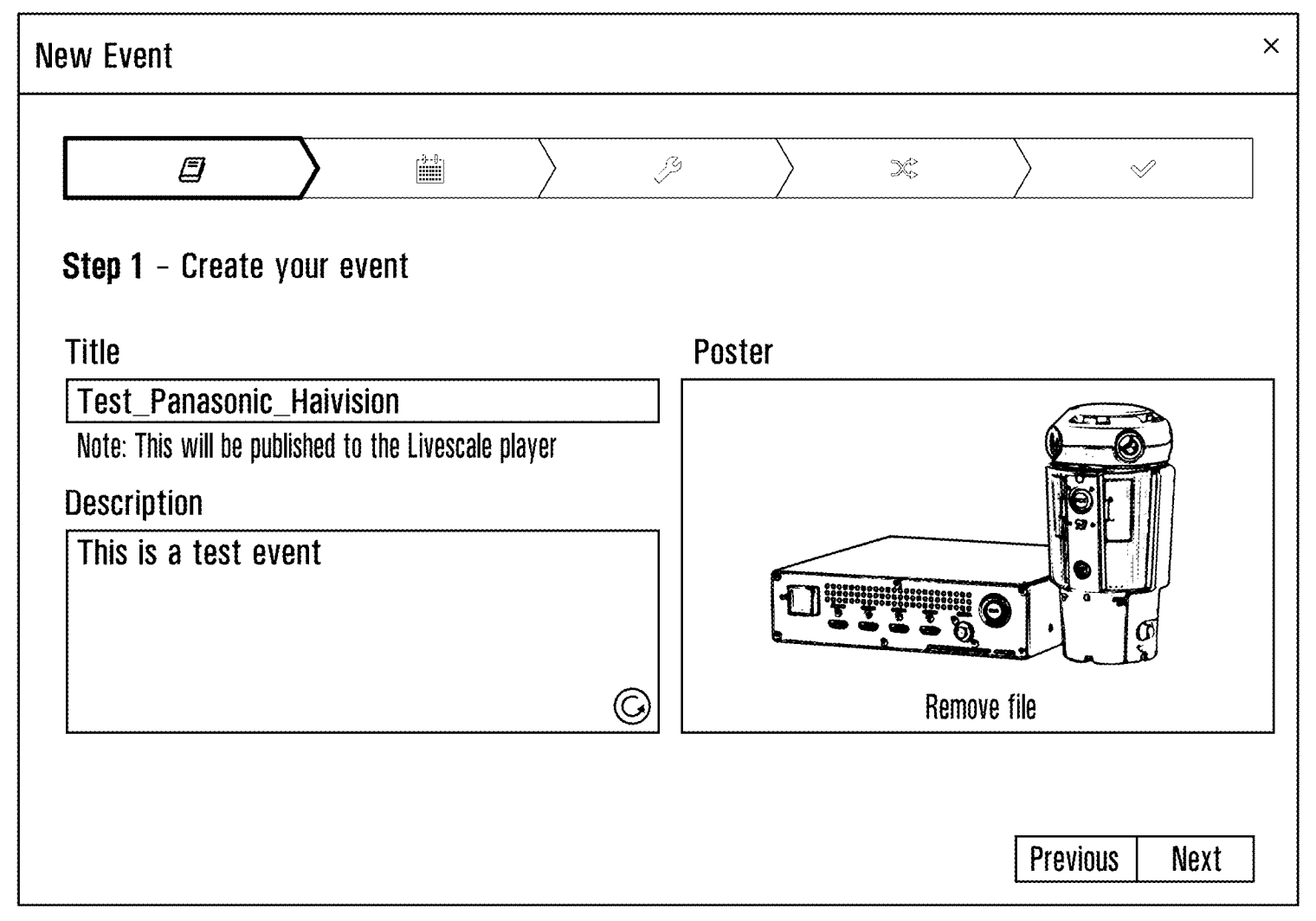

In some embodiments, as illustrated in FIGS. 7 to 16, the user interface 220 maybe be a website. The user first creates an event using the interface 220 website, as shown in FIG. 7. The user can enter details such as title of the event, description of the event and choose a poster for the event. In some embodiment, the poster can be used as the placeholder for the event.

FIG. 8 shows a screenshot of the user interface page used for scheduling of the event. The event can start right away or be scheduled for a later time. The user can also set up other details such as region, ingest and type of player to be used. The user can also choose a schedule for the placeholders.

In next step, as illustrated in FIG. 9, the user sets up the configuration of the event such as video quality, type of video stream (360-degree virtual reality), or more advance details regarding the stream.

Figure 10:
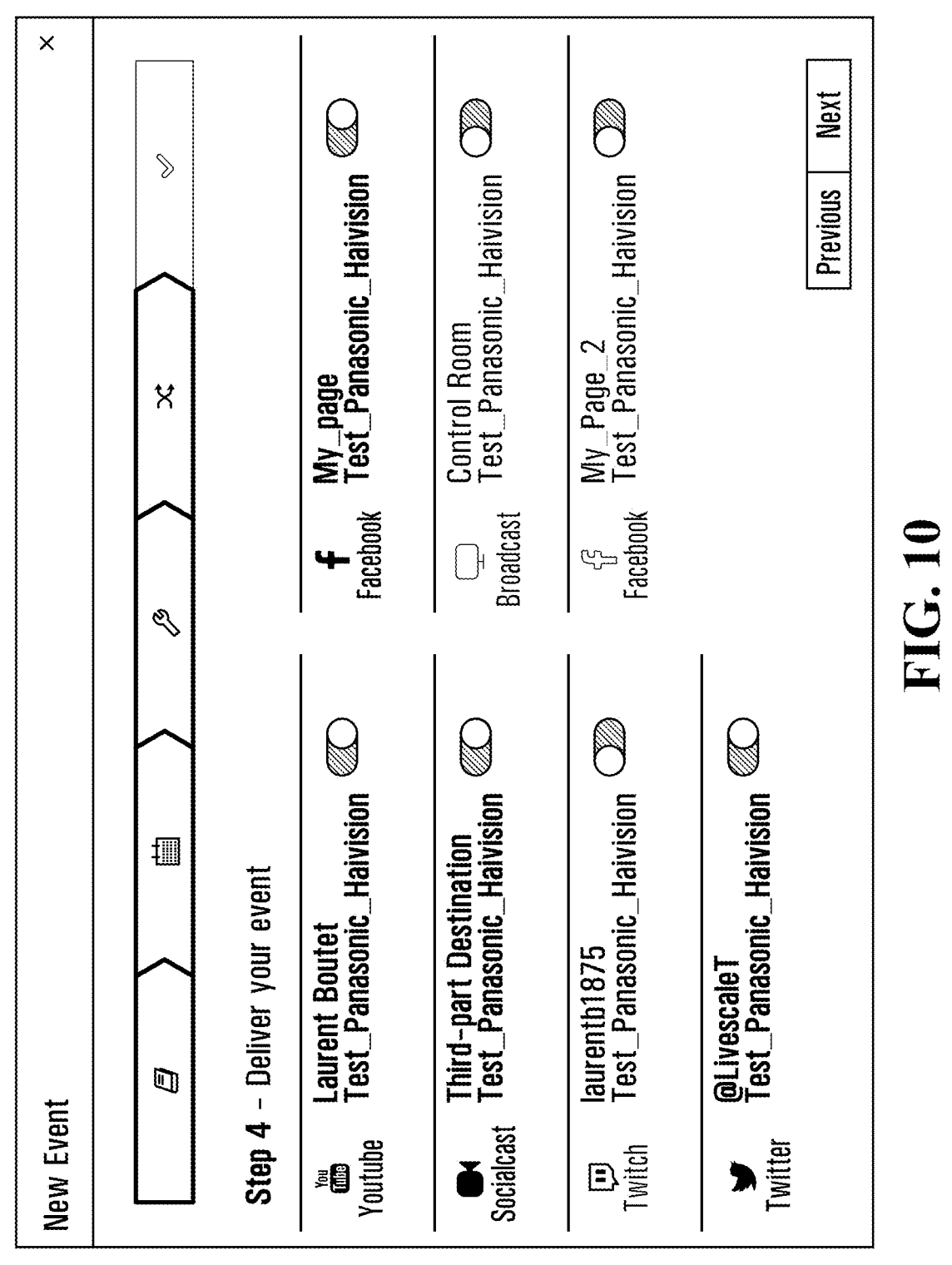
Figure 11:
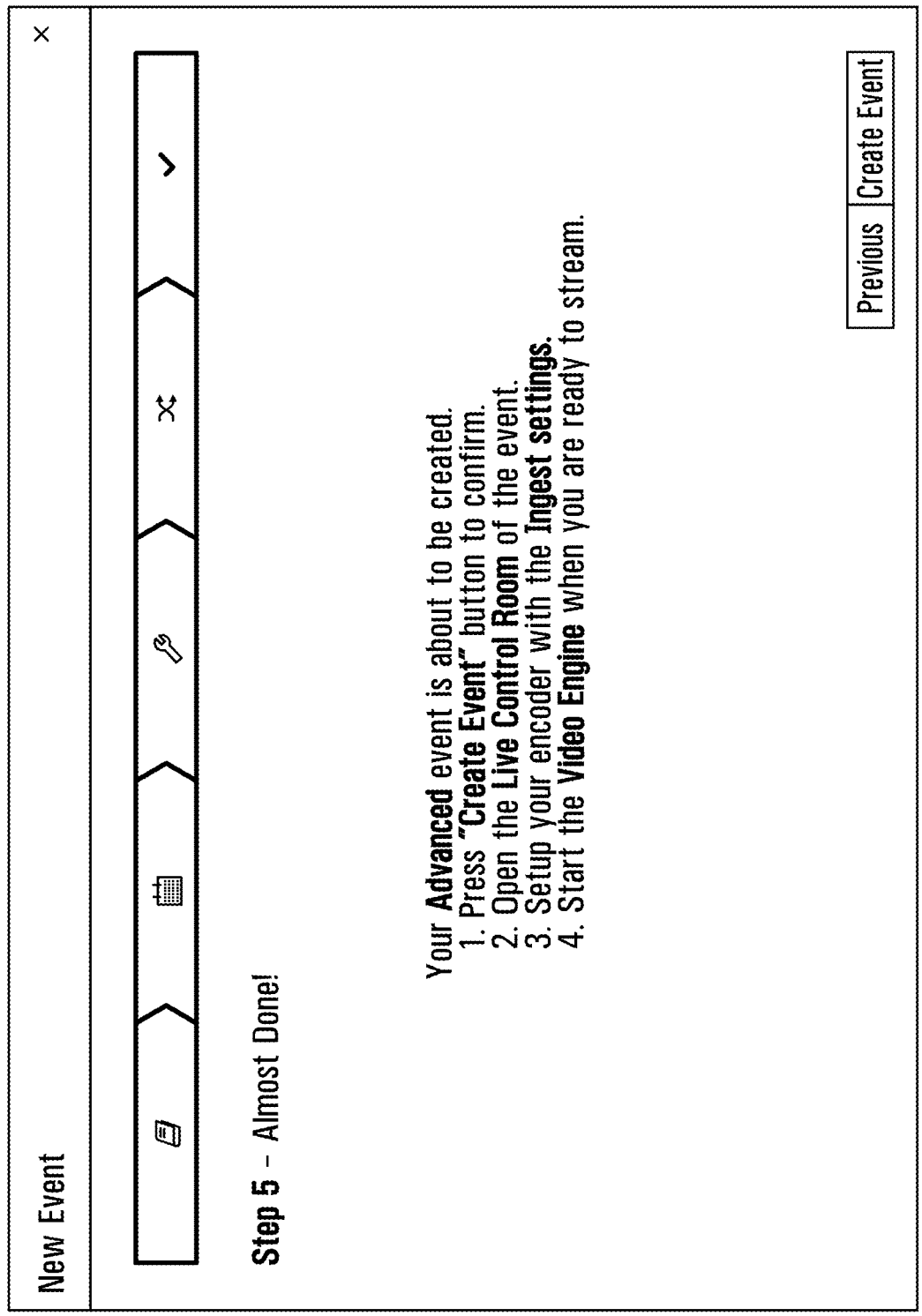
FIG. 11 shows a screenshot of the user interface page used to finalize the event creation, according to a particular example of implementation.

FIG. 10 shows a screenshot of the user interface page used to select destinations to which the event has to be broadcasted. In the next step, as shown in FIG. 11, the user finalizes the event creation.

Figure 12B:
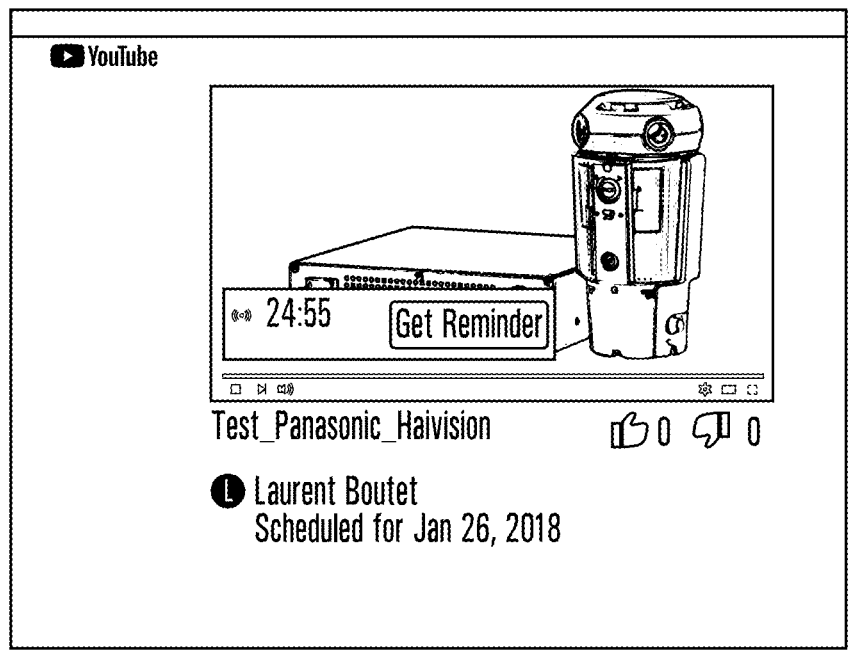
Figure 12C:
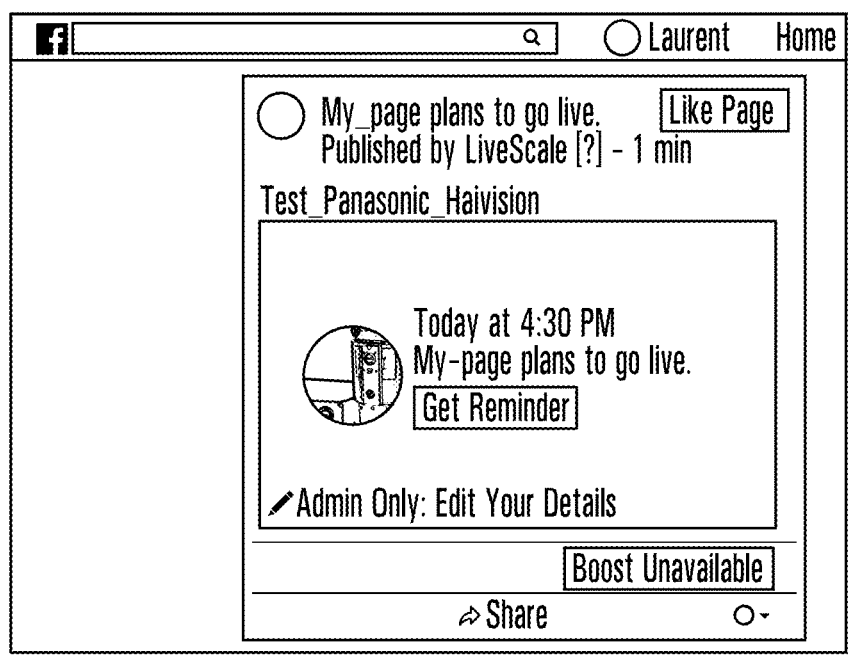

FIGS. 12A, 12B and 12C show examples of the placeholders created by platform respectively for YouTube and Facebook.

Figure 13:
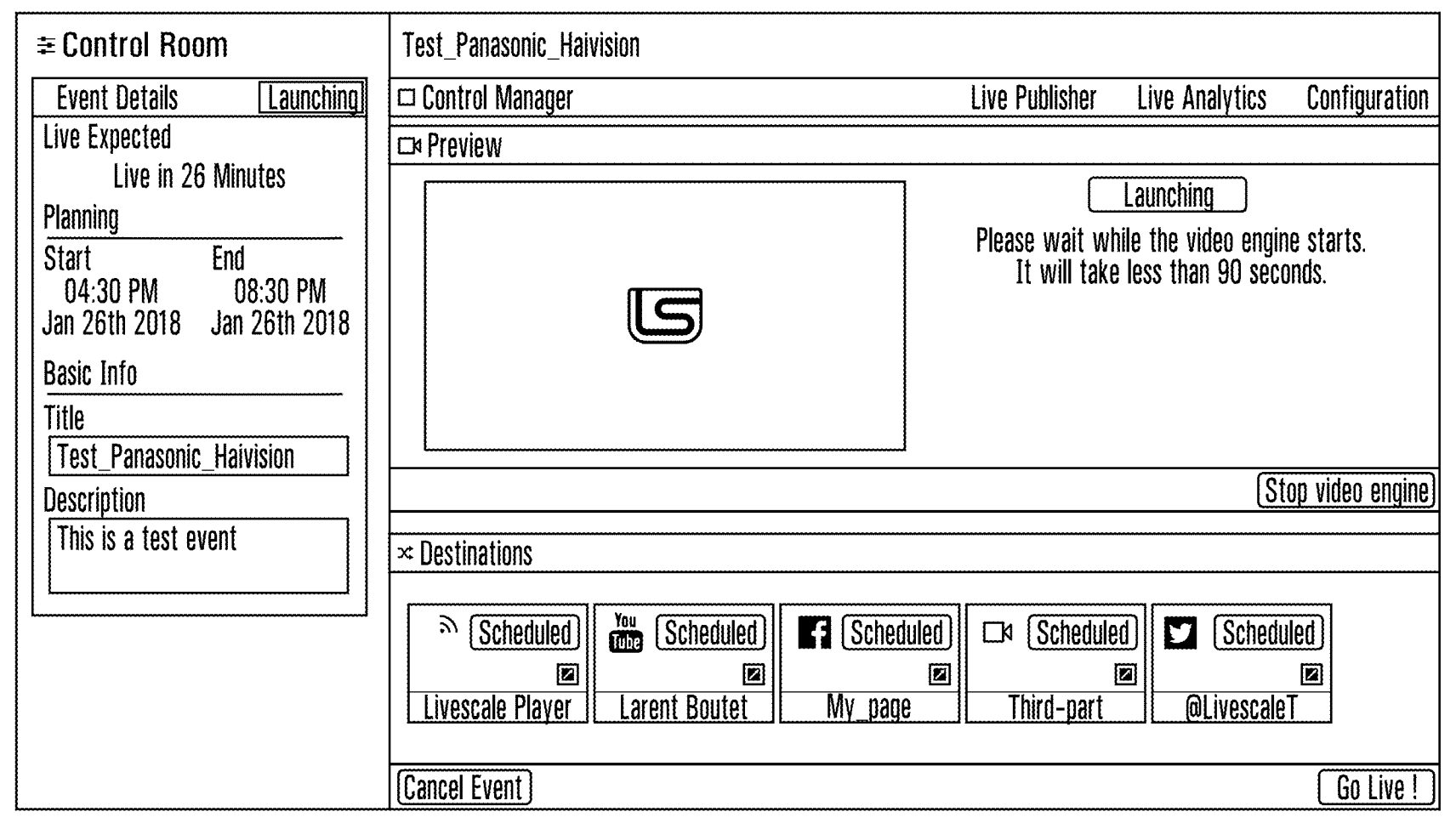

The user interface 220, as illustrated in FIG. 13, provides the user with a control manager page which gives the user the ability to turn the streaming on and off for different destination platforms, stop the video engine, cancel the event or make changes to the other setting.

Figure 14:
FIG. 14 shows a screenshot of the control manager page of the user interface page when video feed is received, and the event is ready to go live, according to a particular example of implementation.
Figure 15A:
FIGS. 15A, 15B and 15C show screenshots of events being broadcasted by the present invention on different delivery platforms.
Figure 15B:
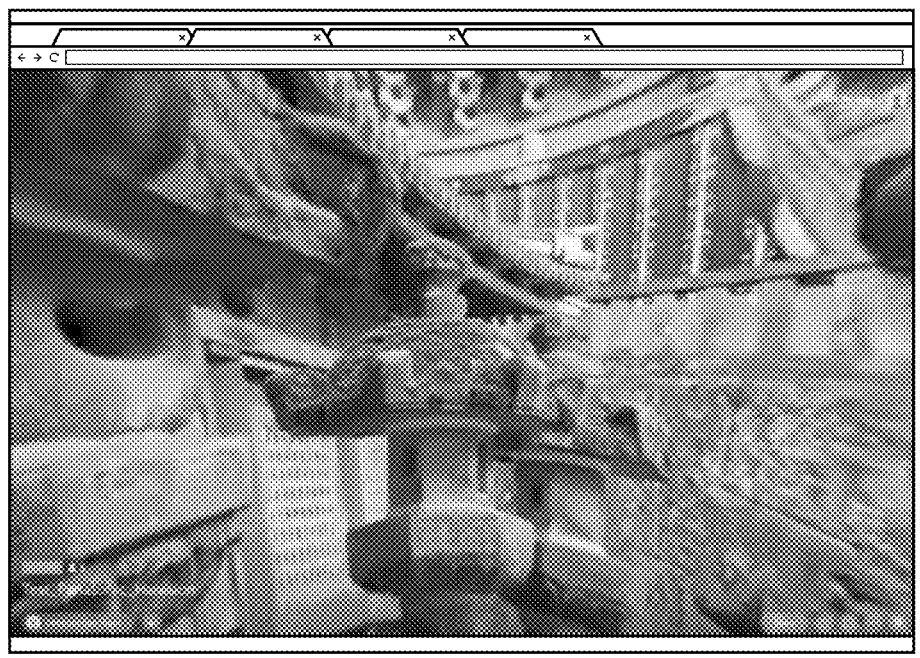
Figure 15C:
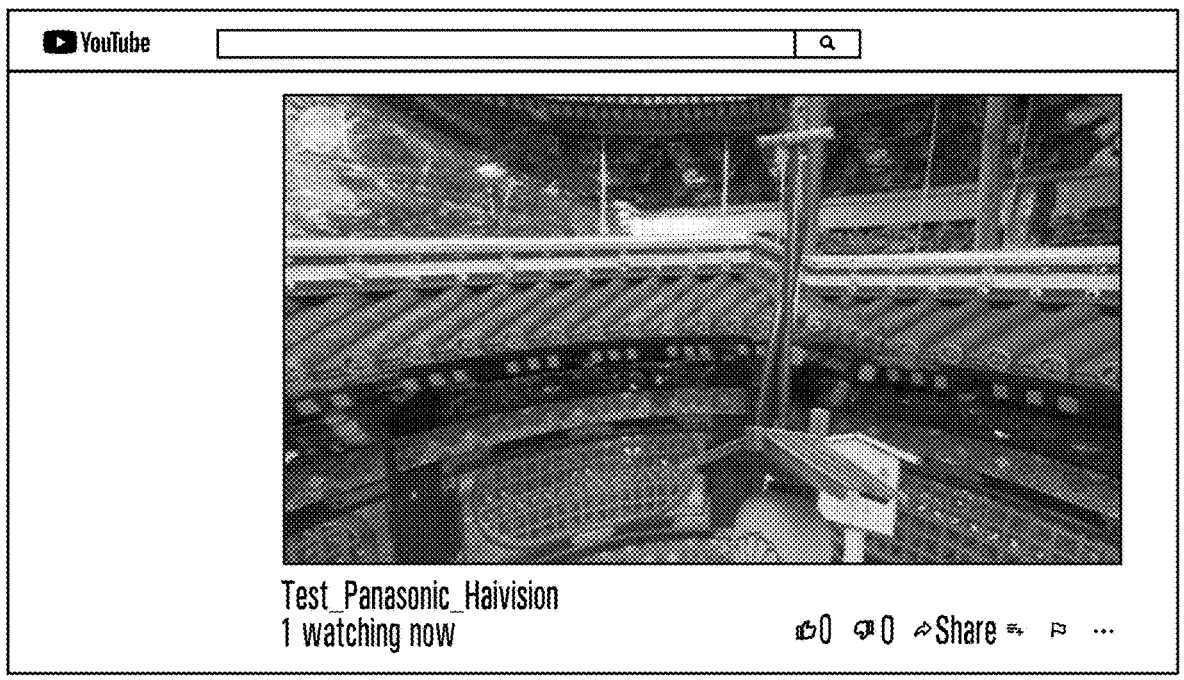

FIG. 14 shows the same control manager page when video feed is received, and the event is ready to go live. FIGS. 15A, 16B, and 16C show the event being broadcasted by the platform on different delivery platforms.

Figure 16:
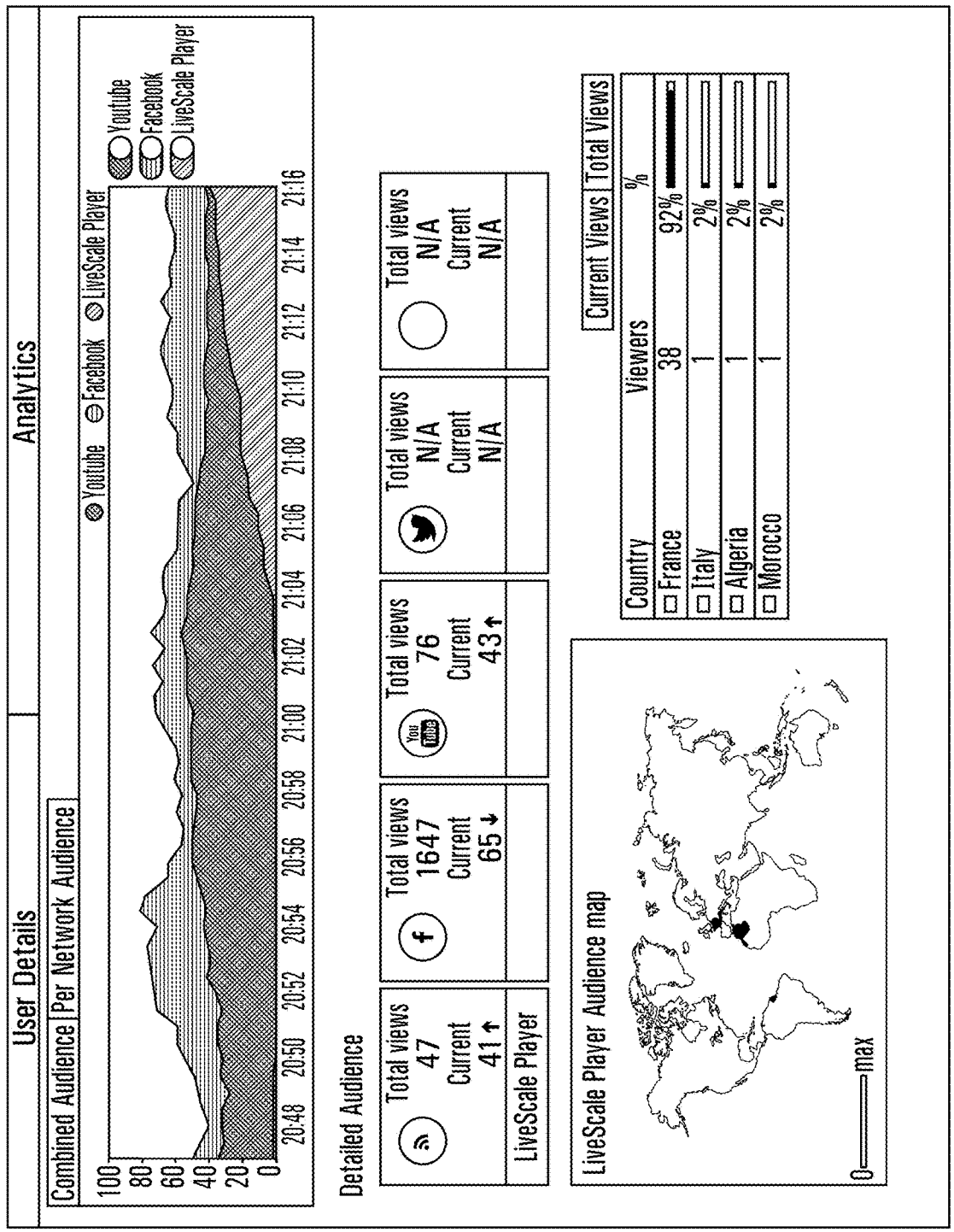
FIG. 16 shows a screenshot of the real-time analytics page of the user interface page, according to a particular example of implementation.

As described above, in some embodiments, the platform provides real-time analysis of the KPI with the real-time analysis module 314. This analysis can be viewed by the user via the user interface. FIG. 16 shows an example of such an analysis shown on the user interface in accordance with one embodiment of the present disclosure. As shown in FIG. 16, KPI may include information on the number of viewers per broadcasting platform and total for all broadcasting platforms (such as Livescale player, YouTube™, Facebook™, Tweeter™, etc.). The result of the analysis performed as shown may include providing diagrams of the KPI received from the broadcasting platforms showing and comparing number of viewers per broadcasting platform at different times, showing a total number of views in time, showing the changes in the number of views for each platform in time, showing number and percentage of the total viewers in different regions, and showing an audience map for viewers in different regions and the analytics thereof.

What is claimed is:

1. A live broadcast streaming system comprising:
   an ingest decoding module;
   a processing and encoding module;
   a video routing module;
   a collection module;
   a real-time analysis module;
   a reporting module;
   at least one database; and
   a control module comprising:
      a processor; and
      a non-transitory computer-readable medium containing instructions that, when executed by said processor, cause said processor to perform:
         receiving, from a client user interface, client credentials for each desired heterogenous delivery platforms and client instructions regarding an event to be broadcasted, said instructions comprising: a source for receiving said event; a streaming schedule for broadcasting said event; configuration details for streaming said event; and said desired heterogenous delivery platforms;
         authenticating said client credentials for each of said desired heterogenous delivery platforms to authorize said broadcasting of said event, said authenticating comprising using an access delegation standard in which a platform specific access token is issued for each of said desired heterogenous delivery platforms, said platform specific tokens being operable to authenticate said client credentials;
         delivering said event based on said schedule for broadcasting, said delivering comprising:
            decoding a contribution stream received from said source by said ingest decoding module and providing a decoded stream;
            receiving said decoded stream by said processing and encoding module and providing a plurality of output streams each having a different bitrate; and
            receiving said plurality of output streams and directing them to said desired heterogenous delivery platforms using said video routing module;
            collecting key performance indicators from each of said desired heterogenous delivery platforms by said collection module, wherein said key performance indicators include at least one of: information on viewers for each of said delivery platforms, changes in said information for each of said delivery platforms, information on viewers in different geographical regions for each of said delivery platform;
            storing said key performance indicators in said at least one database;
            performing analysis on said key performance indicators by said real time analysis module and providing results, wherein said performing analysis includes at least one of:
               providing diagrams and indicators for one or more of each of said key performance indicators at different times and regions;
               showing a summation of said key performances indicators at different times and regions;
               showing changes in said key performance indicators at different times and regions; and
               showing an audience map for showing viewers at different times and regions;
            storing said results in said at least one database and reporting said results of said analysis by said reporting module to said user interface.

2. The system as defined in claim 1, wherein said system is operative as a cloud-based service to receive said client instructions over a computer network from different clients.

3. The system as defined in claim 1, wherein said collecting key performance indicators by said collection module comprises providing in said collection module or in said instructions a collection profile for each of said desired heterogenous delivery platforms.

4. The system as defined in claim 1, wherein said non-transitory computer-readable medium further contains instructions that cause said processor to perform:
   receiving, from a client user interface, client instructions regarding a schedule for placeholders and content for placeholders;
   creating placeholders on each of said desired heterogenous delivery platform based on said schedule for placeholders and said content for placeholders.

5. The system as defined in claim 4, wherein said key performance indicators are used by said control module to adjust said schedule for placeholders.

6. The system as defined in claim 1, wherein video routing module comprises a web streaming module controlled by said control module to broadcast to web viewers for direct streaming to web browsers of viewers.

7. The system as defined in claim 6, wherein said web streaming module is used for over-the-top broadcasting.

8. The system as defined in claim 1, wherein said key performance indicators stored on said at least one database is used by said control module to adjust said configuration details for streaming said event.

9. The system as defined in claim 1, wherein said key performance indicators stored on said at least one database is used by said control module, to adjust said schedule for streaming said event.

10. A live broadcast streaming system comprising:
   an ingest decoding module;
   a processing and encoding module;
   a video routing module;
   a collection module;
   a real-time analysis module;
   a reporting module;
   at least one database; and
   a control module comprising:
      a processor; and
      a non-transitory computer-readable medium containing instructions that, when executed by said processor, cause said processor to perform:
         receiving, from a client user interface, client credentials for each desired heterogenous delivery platforms and client instructions regarding an event to be broadcasted, said instructions comprising: a source for receiving said event; a streaming schedule for broadcasting said event; configuration details for streaming said event; and said desired heterogenous delivery platforms;

authenticating said client credentials for each of said desired heterogenous delivery platforms to authorize said broadcasting of said event, said authenticating comprising using an access delegation standard in which a platform specific access token is issued for each of said desired heterogenous delivery platforms, said platform specific tokens being operable to authenticate said client credentials;

delivering said event based on said schedule for broadcasting, said delivering comprising:
  decoding a contribution stream received from said source by said ingest decoding module and providing a decoded stream;
  receiving said decoded stream by said processing and encoding module and providing a plurality of output streams each having a different bitrate; and
  receiving said plurality of output streams and directing them to said desired heterogenous delivery platforms using said video routing module;
  collecting key performance indicators from each of said desired heterogenous delivery platforms by said collection module, wherein said key performance indicators include at least one of: information on viewers for each of said delivery platforms, changes in said information for each of said delivery platforms, information on viewers in different geographical regions for each of said delivery platform;
  storing said key performance indicators in said at least one database;
    performing analysis on said key performance indicators by said real time analysis module and providing results, wherein said performing analysis includes providing diagrams and indicators for one or more of each of said key performance indicators at different times and regions and showing changes in said key performance indicators at different times and regions;
    storing said results in said at least one database and reporting said results of said analysis by said reporting module to said user interface.

11. A live broadcast streaming system comprising:
an ingest decoding module;
a processing and encoding module;
a video routing module;
a collection module;
a real-time analysis module;
a reporting module;
at least one database; and
a control module comprising:
  a processor; and
  a non-transitory computer-readable medium containing instructions that, when executed by said processor, cause said processor to perform:
  receiving, from a client user interface, client credentials for each desired heterogenous delivery platforms and client instructions regarding an event to be broadcasted, said instructions comprising: a source for receiving said event; a streaming schedule for broadcasting said event; configuration details for streaming said event; and said desired heterogenous delivery platforms;
  authenticating said client credentials for each of said desired heterogenous delivery platforms to authorize said broadcasting of said event, said authenticating comprising using an access delegation standard in which a platform specific access token is issued for each of said desired heterogenous delivery platforms, said platform specific tokens being operable to authenticate said client credentials;
  delivering said event based on said schedule for broadcasting, said delivering comprising:
    decoding a contribution stream received from said source by said ingest decoding module and providing a decoded stream;
    receiving said decoded stream by said processing and encoding module and providing a plurality of output streams each having a different bitrate; and
    receiving said plurality of output streams and directing them to said desired heterogenous delivery platforms using said video routing module;
    collecting key performance indicators from each of said desired heterogenous delivery platforms by said collection module, wherein said key performance indicators include at least one of: information on viewers for each of said delivery platforms, changes in said information for each of said delivery platforms, information on viewers in different geographical regions for each of said delivery platform;
    storing said key performance indicators in said at least one database; performing analysis on said key performance indicators by said real time analysis module and providing results, wherein said performing analysis includes showing an audience map for showing viewers at different times throughout the broadcast and regions;
    storing said results in said at least one database and reporting said results of said analysis by said reporting module to said user interface.

* * * * *